US005380060A

United States Patent [19]
Sponsler et al.

[11] Patent Number: 5,380,060
[45] Date of Patent: Jan. 10, 1995

[54] VEHICLE SEAT ASSEMBLY WITH FOLDING SEAT BACK AND INTEGRAL CHILD SEAT AND INTERLOCK MECHANISM

[75] Inventors: Karl G. Sponsler, Plymouth; Kurt Seibold, Dearborn Heights, both of Mich.

[73] Assignee: Hoover Universal, Inc., Plymouth, Mich.

[21] Appl. No.: 89,446

[22] Filed: Jul. 12, 1993

[51] Int. Cl.⁶ .................................................. A47C 15/00
[52] U.S. Cl. .................................. 297/238; 297/378.12
[58] Field of Search ................ 297/238, 378.12, 113, 297/378.1

[56] References Cited

U.S. PATENT DOCUMENTS

| | | | |
|---|---|---|---|
| 2,833,336 | 5/1958 | McGregor | 297/378.12 |
| 3,517,965 | 6/1970 | Cowles et al. | 297/378.12 |
| 5,161,855 | 11/1992 | Harmon | 297/238 |
| 5,280,995 | 1/1994 | Elton | 297/238 |

Primary Examiner—James R. Brittain
Assistant Examiner—David E. Allred
Attorney, Agent, or Firm—Harness, Dickey & Pierce

[57] ABSTRACT

A vehicle seat assembly having an integral child seat and a seat back which is rotatably mounted. An interlock is provided between the child seat and a latch for the rotating seat back to prevent release of the seat back latch when the child seat has been deployed and conversely, when the seat back latch has been released, the interlock prevents deployment of the child seat.

16 Claims, 6 Drawing Sheets

VEHICLE SEAT ASSEMBLY WITH FOLDING SEAT BACK AND INTEGRAL CHILD SEAT AND INTERLOCK MECHANISM

BACKGROUND AND SUMMARY OF THE INVENTION

The present invention relates to a vehicle seat assembly with an integral child seat and a seat back which is rotatably mounted and in particular to an interlock between the integral child seat assembly and the rotating seat back.

Many vehicle seat assemblies, such as bench seats in a van or multi-purpose passenger vehicle and the rear seats in certain passenger cars, are equipped with seat backs that are rotatable between use and storage positions. The rotating seat back panel is provided in passenger cars in particular to expand the trunk capacity of the vehicle into the rear seat area. In vans, a folding seat back enables larger items to be carried in the van on top of the bench seats and/or the folding seat back reduces the storage space required for a removable bench seat once removed from the vehicle. The rotating seat back typically includes a latch mechanism to hold the seat back in its use position.

Many seat assemblies have been recently developed which include an integral child seat that enables an infant or small child to be safely carried in the vehicle without the need for a separate child seat. Such integral child seats often include one or more rotating panels formed within the seat back of a seat assembly. In a stowed position, these panels form a portion of the adult seat back cushion. When deployed, one panel may serve as a seat cushion for a child occupant, while another panel may be raised to form a headrest. One or more components of the child seat may also be incorporated into the seat cushion.

The child seat, in addition to providing cushions for the child, also provides a separate restraint system. The separate child restraint system typically includes dual shoulder belts and a lap belt. In many cases, the loads from the belts are at least partially transferred to the seat back frame and ultimately from the seat back frame to the vehicle structure.

When a child seat is incorporated into a seat assembly, the seat back is generally not provided with a folding mechanism to enable the seat back to be rotated to a storage position. Instead, the seat back will be permanently placed in the upright use position. This is to guarantee that if a child is sitting on the integral child seat, he/she may not be hurt by a collapsing seat back. As a result, the vehicle purchaser must make a decision between either a child seat or a folding seat back.

It is an object of the present invention to overcome the above tradeoff and provide a folding seat back and an integral child seat in the same seat assembly.

It is a feature of the present invention to provide such a seat assembly with an interlock mechanism to prevent rotation of the seat back from its use position when the child seat has been deployed.

It is a further feature of the present invention that when the seat back has been unlatched, the child seat cannot be deployed.

Many three-passenger bench seats that are equipped with an integral child seat have dual child seats, the two child seats are at each of the outboard seating positions. It is a further feature of the present invention to provide a single interlock mechanism operated by each of the two child seats for preventing the seat back from being rotated from its use position.

The invention of the present application is a seat assembly for use in a motor vehicle comprising a generally horizontal seat cushion having front and rear ends and a seat back including a back panel with upper and lower ends that is movable between an use position, in which the back panel extends generally upward from the rear end of the seat cushion, and a first stowed position. The seat cushion and seat back provide seating surfaces for an adult seat occupant at a seating position. The seat assembly also includes a releasable latch mechanism for retaining the seat back panel in its use position. The latch mechanism is releasable for preventing movement of the seat back panel from its use position.

The seat assembly further includes a child seat providing seating surfaces for a child seat occupant at the seating position and includes a child seat member movable between a stowed position and an use position. The child seat member enables use of the seat assembly at the seating position by a child when the child seat member is in its use position and the child seat member enables use of the seat assembly at the seating position by an adult when the child seat member is in its stowed position.

An interlock mechanism is provided between the latch mechanism and the child seat member for preventing release of the latch mechanism when the child seat member has been moved from its stowed position to its use position. This prevents the seat back panel from moving from its use position when the child seat member has been moved from its stowed position. The interlock mechanism includes a lock member movable into a lock position in which it is engagable with the latch mechanism to prevent release of the latch mechanism and a cable having one end coupled to the child seat member and the other end coupled to the lock member for moving the lock member to its lock position when the child seat member is moved from its stowed position.

Additional benefits and advantages of the present invention will become apparent to those skilled in the art to which this invention relates from the subsequent description of the preferred embodiments and the appended claims.

DETAILED DESCRIPTION OF THE EMBODIMENT

Figure 1:
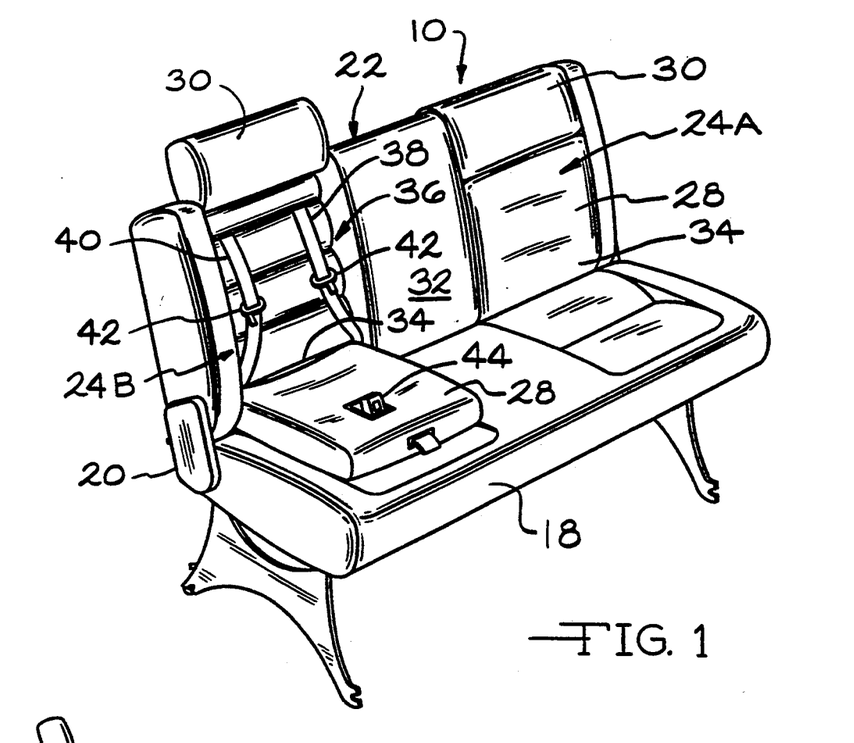
FIG. 1 is a perspective view showing a three-passenger bench seat having dual integrated child seats with one child seat deployed and the other in a stowed position.

The seat assembly of the present invention, shown in FIG. 1 and designated as 10, includes a folding seat back with an integral child seat therein and an interlock between the child seat and the seat back folding mechanism to prevent folding of the seat back when the child seat has been deployed. Seat assembly 10 is a bench seat primarily for use in a van or other multi-purpose passenger vehicle. The seat assembly includes a pair of pedestals 12, each forming front and rear legs 14 and 16 respectively. The pedestals support a lower generally horizontal seat cushion 18. Extending upwardly from the rear end 20 of the seat cushion is a seat back 22. The front legs 14 form hooks 15 at their lower ends and the rear legs 16 include latches 17 at their lower ends for releasably installing the seat assembly into a motor vehicle.

As shown in FIG. 1, seat assembly 10 is a three-passenger bench seat having two outboard seating positions and a center seating position. The seat back 22 at the two outboard seating positions, is equipped with integral child seats 24a and 24b. The integral child seats are generally identical and include child seat cushions 28 and child seat headrests 30. Child seat 24a is shown in a stowed position in which the child seat cushion and headrest are stored within the seat back 22 and form a portion of the front surface 32 of the seat back cushion. Child seat 24b, on the other hand, is in a deployed position. The child seat cushion 28 is rotated to a forwardly extending use position resting upon the top of the seat cushion 18. The child seat cushion 28 is mounted for rotation about a transverse axis at its lower end 34. The headrest 30 is upwardly rotated to a position extending above the seat back to serve as a headrest for a child seat occupant. In the deployed position, a recess 36 in the seat back 22 is revealed. The recess contains belts 38 and 40 of a restraint system for the child seat. The belts have clasps 42 thereon for insertion into a buckle 44 in the child seat cushion. When the clasps are inserted into the buckle, the belts 38 and 40 form a five point restraint for a child seat occupant.

Figure 2:
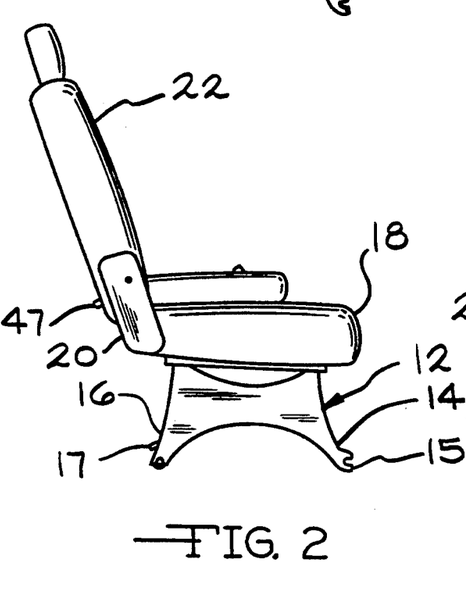
FIG. 2 is a side elevational view of the bench seat of FIG. 1 showing the seat back in its upright use position.
Figure 3:
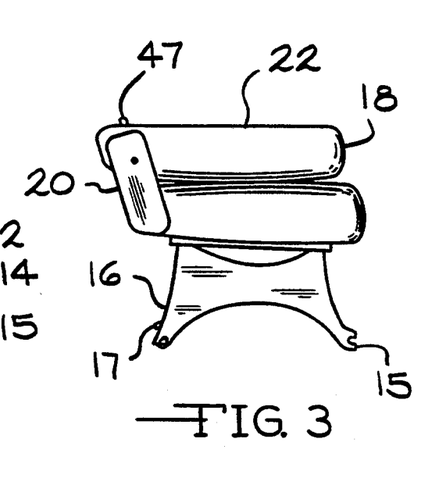
FIG. 3 is a side elevational view of the bench seat of FIG. 1 showing the seat back in a forwardly extending stowed position upon the seat cushion.

In FIG. 2, the seat assembly 10 is shown with the seat back 22 in its upwardly extending use position. In FIG. 3, seat back 22 is shown in a forwardly extending stowed position, resting upon the top of the seat cushion 18. A latch mechanism, described in greater detail below, is operable to hold the seat back 22 in its upright use position. A latch release lever 46, with handle 47 extending from the rear of the seat back, is operable to release the latch mechanism, enabling the seat back to be rotated forward.

Figure 4:
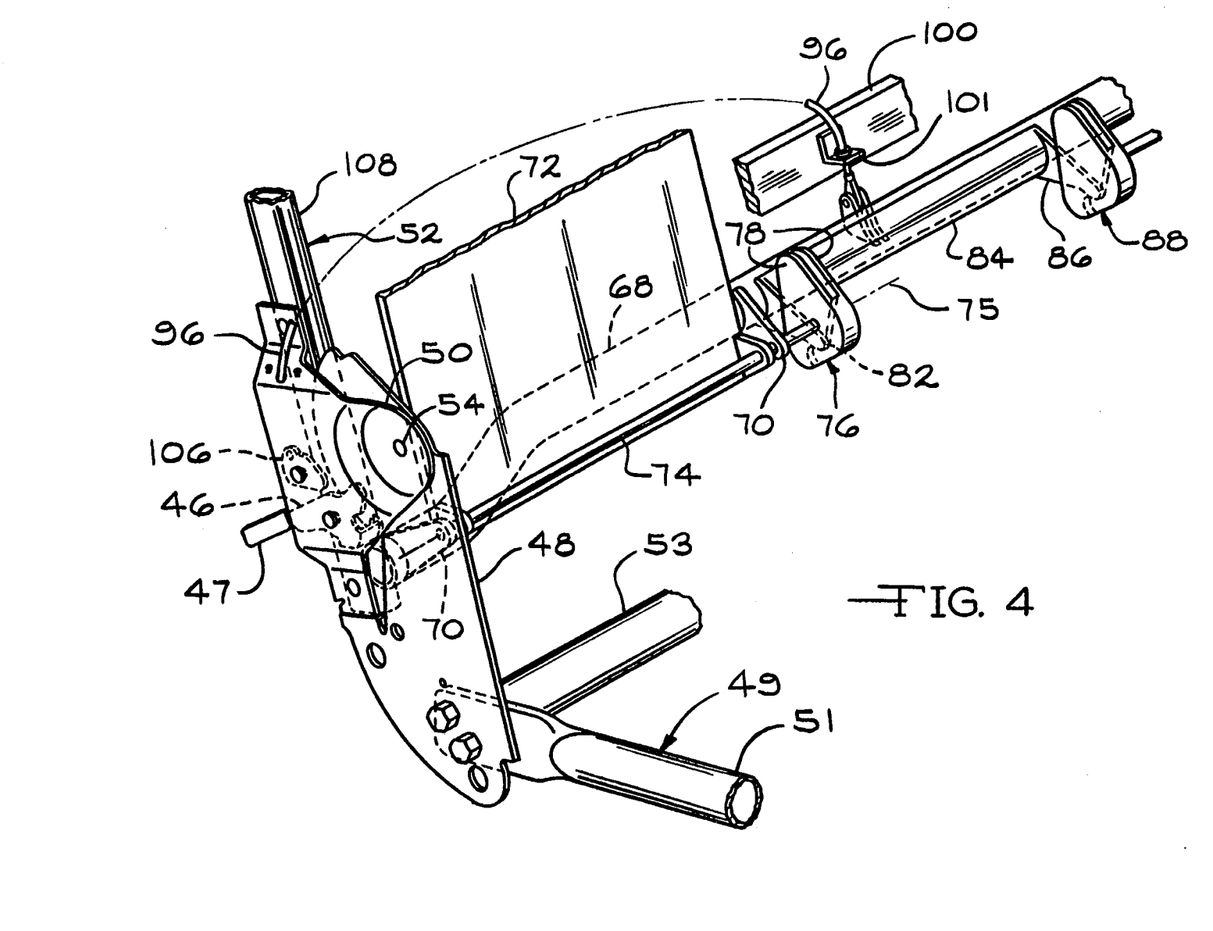
FIG. 4 is a perspective view showing a portion of the seat frame, child seat cushion frame and the interlock mechanism.

With reference to FIG. 4, a portion of the frame of seat assembly 10 is shown in greater detail. The seat cushion 18 includes a frame 49 having side member 51, cross member 53 and a pair of hinge plates 48, only one of which is shown in FIG. 4. Hinge plate 48 extends generally upwardly from the seat cushion for attachment to a hinge plate 50 of the frame 52 of seat back 22. The hinge plate 50 is mounted to hinge plate 48 for rotation of the seat back about the pivot 54.

The seat cushion hinge plate 48 forms an arcuate edge surface 56 (FIGS. 8–10) which is concentric about the pivot 54. Arcuate edge surface 56 terminates at its lower end in a recess 58. The latch release lever 46, which is pivotally mounted to the seat back frame 52 by a pivot pin 60, includes a hook 62 which, when the seat back is in its upright use position, seats within the recess 58 in the seat cushion hinge plate. The hook 62 engages the generally radial end surface 64 at the lower end of the arcuate edge surface. This prevents forward or clockwise rotation of the seat back, as viewed from FIG. 8.

Figure 8:
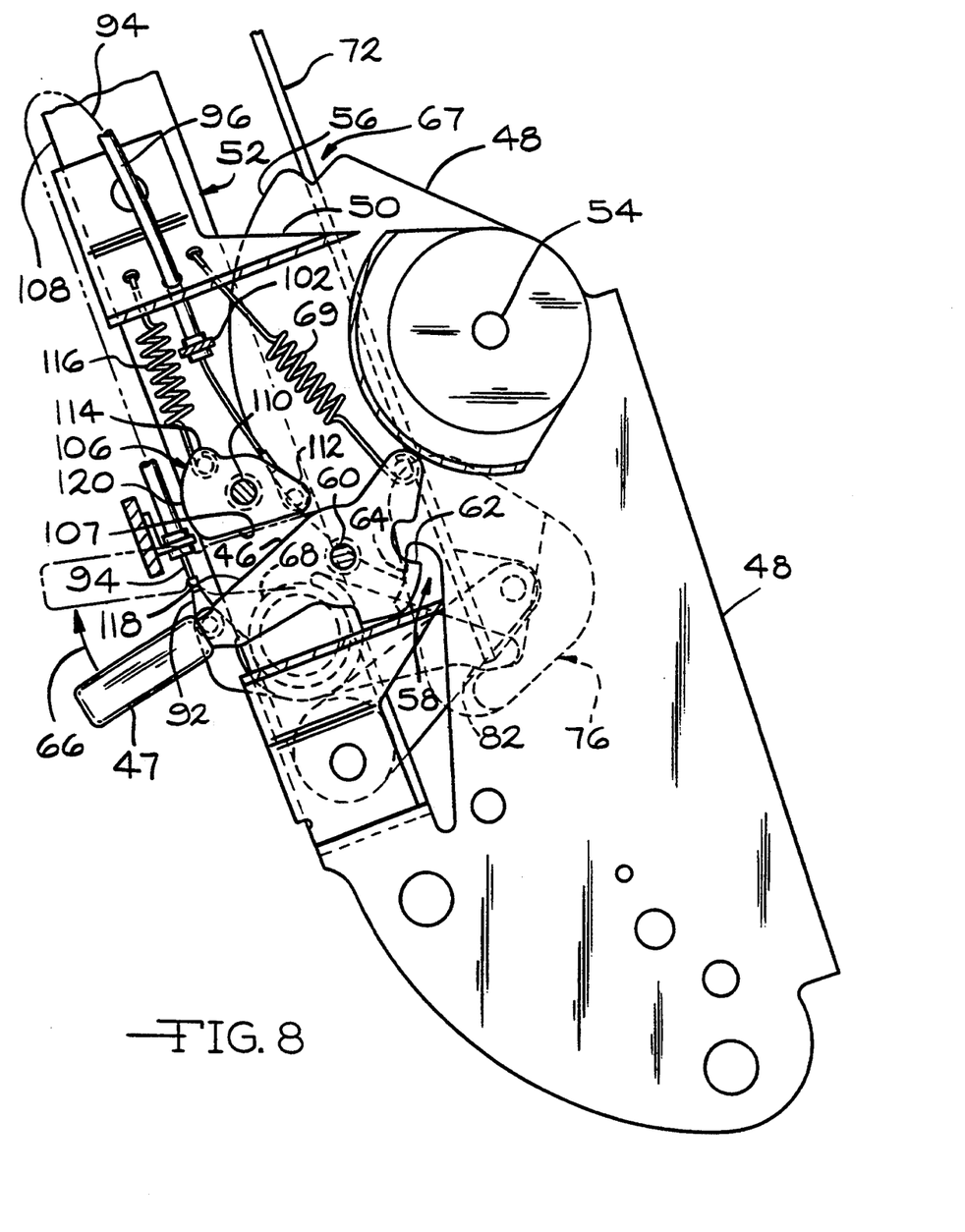
FIG. 8 is a side view of the seat back hinge and latch with the seat back latched in its upright use position and with the child seat in its stowed position.
Figure 9:
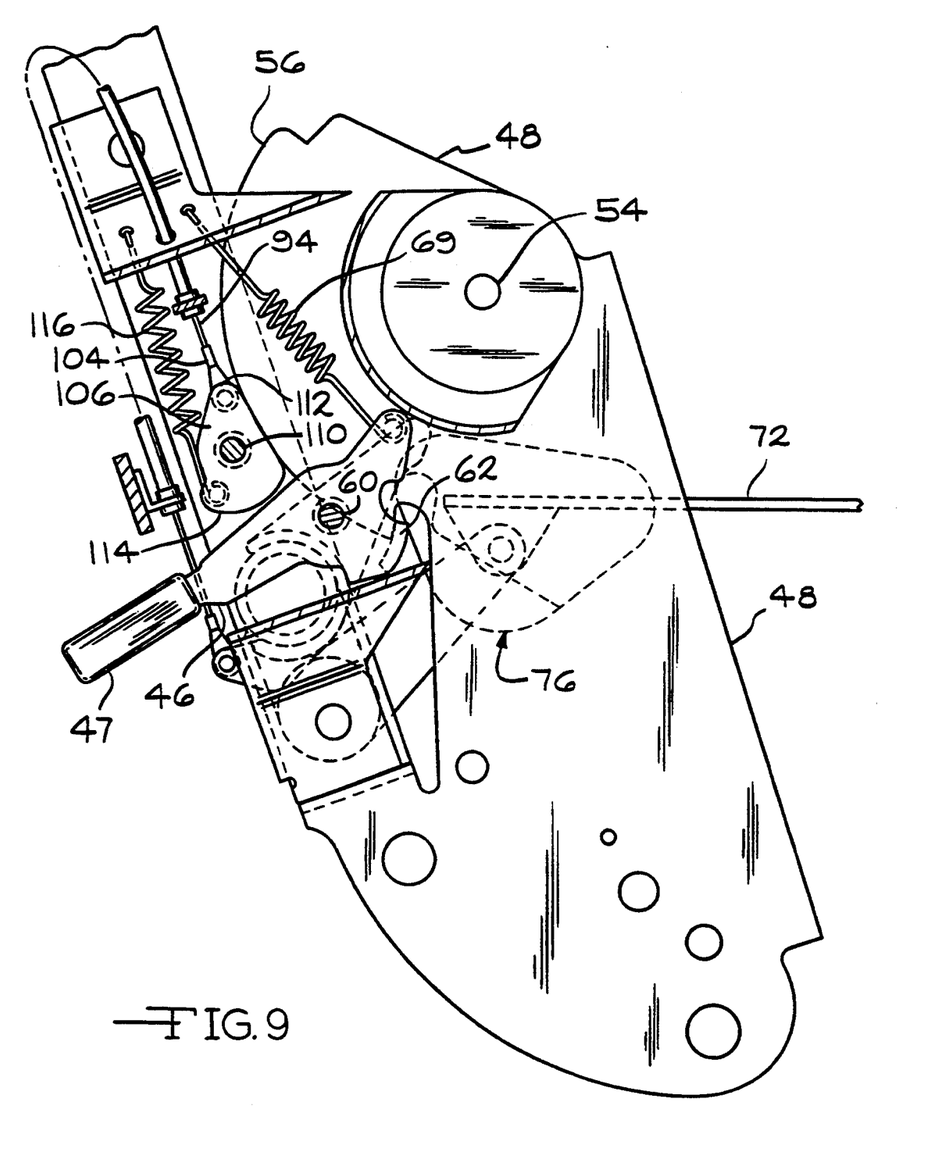
FIG. 9 is a side view of the hinge and latch of FIG. 8 with the child seat in its deployed position.

Clockwise rotation of the latch release lever 46, by pulling upward on the handle 47, as shown by the arrow 66, moves the release lever along a predetermined path and withdraws the hook 62 from recess 58. This enables forward rotation of the seat back. As the seat back is rotated forward, the hook 62 engages and slides along the arcuate edge portion 56. This maintains the latch release lever 46 in the release position. Once the seat back is fully forward, the hook 62 will seat in recess 67 at the opposite end of the arcuate edge surface 56. This locks the seat back in its stowed position until the latch release lever is again actuated to a release position. Spring 69 operates to bias the lever 46 against the arcuate edge 56 and into the recesses 58 and 69.

The seat back frame 52 includes a lower cross member 68 which extends transversely across the seat back. The pan 72 of child seat cushion 28 is pivotally mounted to the lower cross member 68 by brackets 70. The pivot rod 74 is fixed to seat cushion pan 72 for rotation with the pan about the axis 75.

The interlock between the child seat cushion 28 and the seat back release latch begins with a cam 76 attached to the rod 74 and which rotates with the rod about the axis 75 as the child seat cushion is rotated between its stowed and use positions. Cam 76 is a U-shaped member having a pair of spaced walls 78 and a cam surface 80 disposed between the two walls 78 at the base of the U-shaped cam 76. The two walls 78 retain a pivot lever 82 therebetween that is rotatably mounted to the lower cross member 68. In the embodiment shown, the pivot lever 82 is integrally formed as a part of a pivot bracket 84 which is snap-fit onto the lower cross member 68. The lower cross member 68 is a round tube so as to enable the pivot bracket 84 to rotate about the tube axis.

Figures 5, 6, 7:
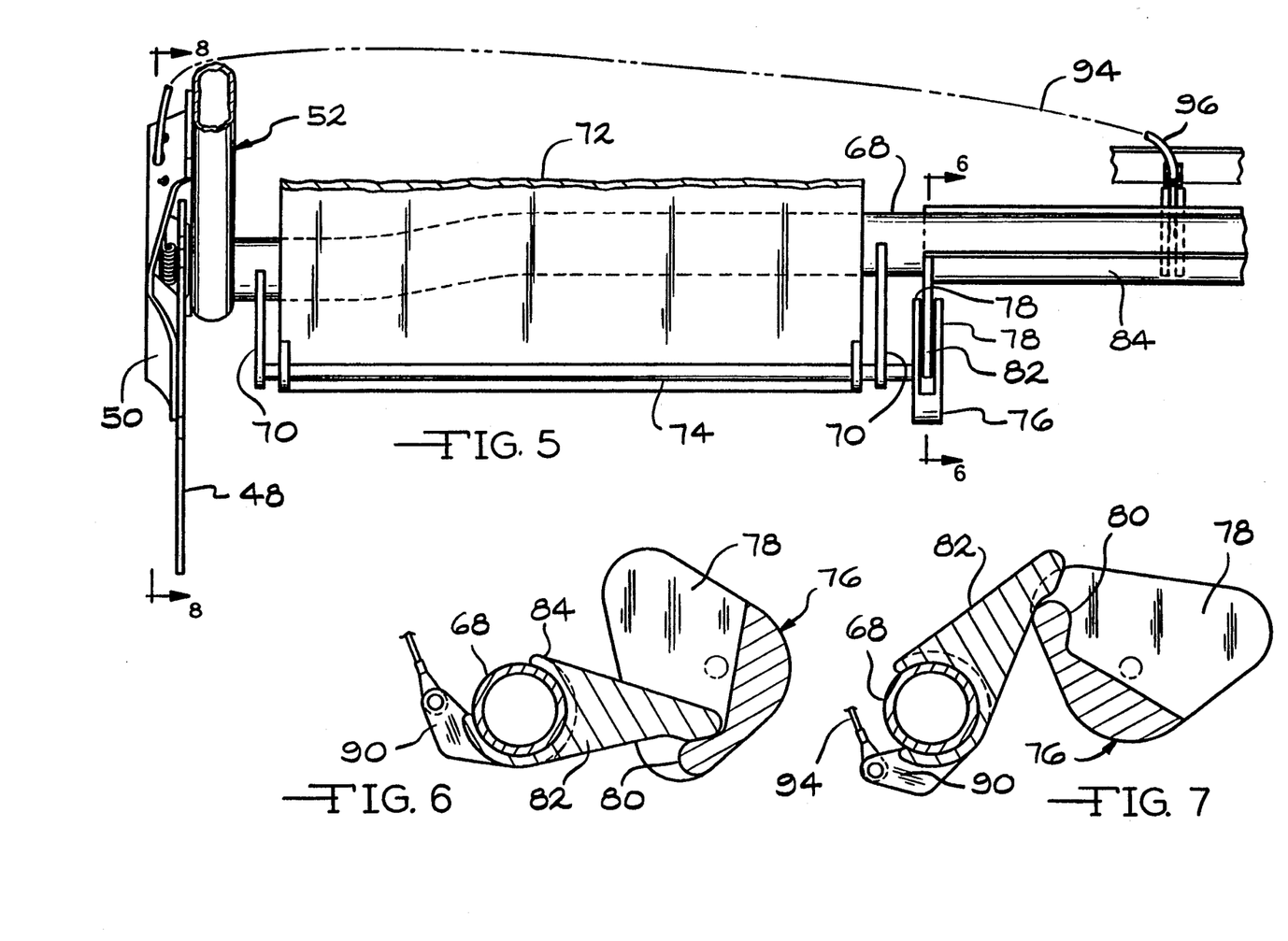
FIG. 5 is a top view of the seat frame shown in FIG. 4.
FIG. 6 is a sectional view as seen from the lines 6—6 of FIG. 5 showing the connection of the interlock mechanism with the child seat cushion in the stowed position of the child seat.
FIG. 7 is a sectional view as seen from substantially the line 6—6 of FIG. 5 showing the connection between a child seat cushion and the interlock mechanism when the child seat is deployed.

The pivot bracket 84 is elongated and extends to a second pivot lever 86 at its opposite end which engages with a second cam 88 identical to cam 76 and connected to the child seat cushion 28 of child seat 24a. Rotation of either child seat cushion will result in rotation of the pivot bracket 84. Pivot bracket 84 includes a rearwardly projecting clevis 90 to which is mounted one end 92 of a cable 94. Cable 94 extends through a sheath 96 which is attached to bar 100 of the seat back frame 52 by bracket 101. Upon rotation of the pivot bracket 84 as shown by the progression from FIG. 6 to FIG. 7, the pivot bracket is rotated and the cable 94 is pulled.

The opposite end of the cable sheath 96 is coupled to the seat back frame 52 adjacent to the seat back latch mechanism by a bracket 102. The opposite cable end 104 is attached to a stop plate 106. Stop plate 106 is rotatably mounted to the upright side member 108 of the seat back frame for rotation about the pivot pin 110.

The cable 94 is connected to a lobe 112 of the stop plate radially spaced from the pivot pin 110 such that upon pulling on of the cable 94, the stop plate is rotated about the pivot pin. As shown in FIG. 8, the lobe 112 extends to the right of the pivot pin 110 while a second lobe 114 extends to the left of the pin. A bias spring 116 is connected to the stop plate and extends in the same direction as the cable 94, urging the stop plate in a clockwise direction and thereby providing tension to the cable 94.

Stop plate 106 has a release position shown in FIG. 8 when the child seat is in its stowed position. In this position the side edge 107 of the stop plate confronts the latch release lever 46. Because side edge 107 is along the narrow side of the stop plate, the edge 107 is spaced sufficiently from the lever 46 so that the lever is free to rotate to release the latch mechanism. However, when the child seat assembly is deployed and cable 94 is pulled, the stop plate is rotated in a counterclockwise direction causing the lobe 114 to move into a confronting position with respect to the lever 46. The edge surface 120 of lobe 114 is concentric about the pivot pin 110 and is spaced further from the pin 110 than is the side edge 107. The result is that edge surface 120 is closely spaced relative to the lever 46.

This close spacing of the stop plate to the latch release lever prevents rotation of the latch release lever sufficient to disengage the hook 62 from the end wall 64 of the seat cushion hinge plate 48. As a result, the seat back cannot be unlatched and therefore cannot be rotated forward. By maintaining the seat back in a latched position, a load path is provided for the child seat assembly restraint belts from the seat back to the seat cushion and from there to the vehicle structure through the pedestals 12.

The interlock is also operable to prevent deployment of the child seat assembly when the seat back latch has been released. Release of the seat back and forward rotation of the seat back results in contact of the hook portion 62 with the arcuate edge surface 56 of the seat cushion hinge plate. This contact maintains the latch release lever 46 in the rotated release position shown in phantom in FIG. 8. With the release lever 46 in the release position, the lever is closely spaced from the stop plate edge 107 such that rotation of the stop plate 106 is prevented. If the stop plate 106 cannot be rotated, the cable 94 cannot be pulled and the pivot bracket 84 and pivot levers 82 cannot rotate. This results in the cams 76 and 88 being non-rotatable, thus preventing the child seat cushions from being rotated to deployed positions.

Figure 10:
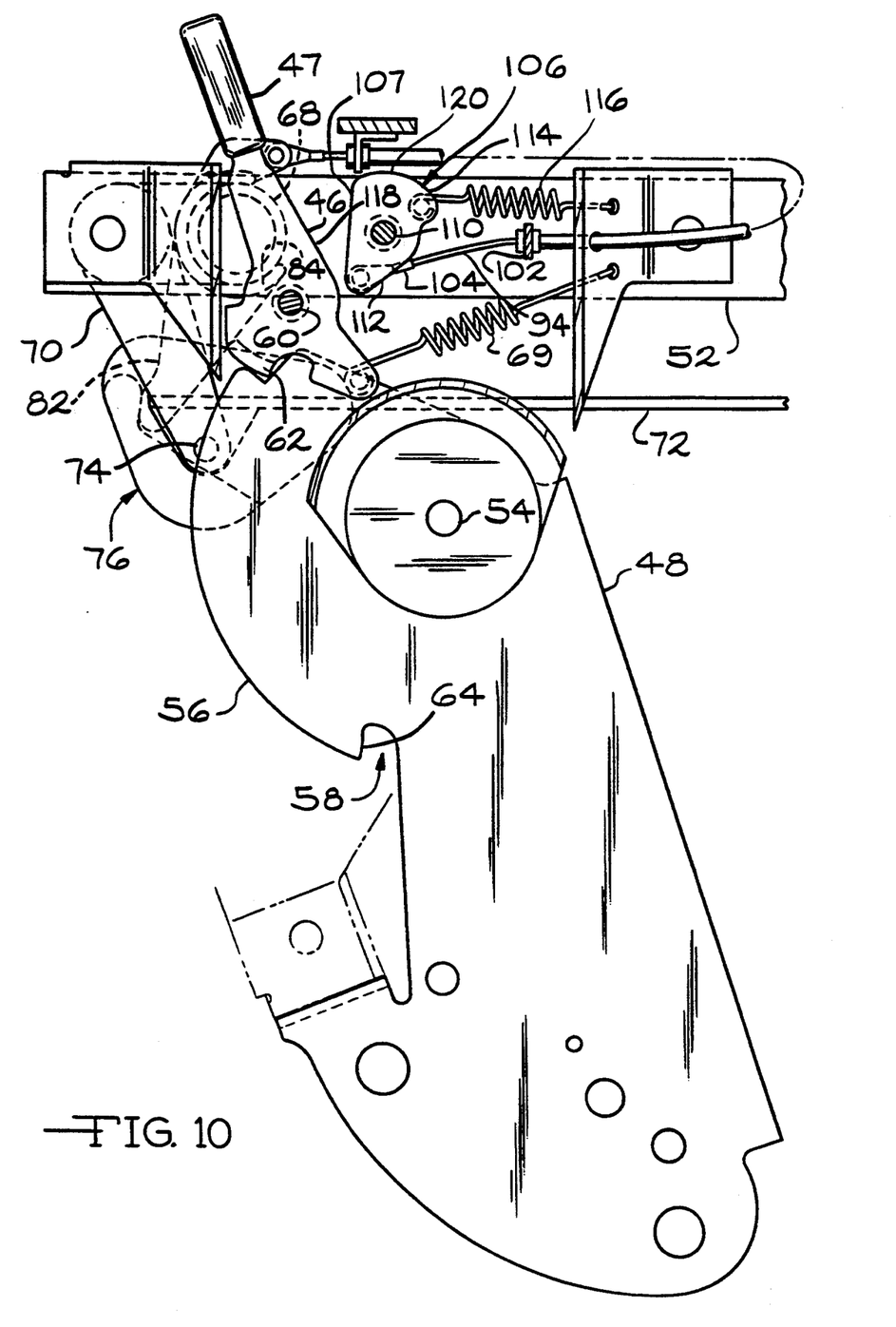
FIG. 10 is an elevational view of the hinge and latch with the seat back folded forward and the child seat in its stowed position.

When the seat back is in its fully rotated position extending forward upon the seat cushion, the latch lever 46 returns to a latched position as shown in FIG. 10. In this position of the seat back, the child seat cushion can not be rotated from the seat back since the entire seat back is now resting upon the seat cushion. The only rotation that can occur is to raise the seat back while holding the child seat cushion in a stationary position. This can only occur by first releasing the latch lever 46, afterwhich, the latch lever will prevent rotation of a stop plate thus preventing the seat back from being rotated to its upright position while the child seat cushion is held in its deployed position.

The seat assembly of the present invention includes an integral child seat and is equipped with a folding mechanism for rotating the seat back between use and stowed positions. An interlock mechanism is provided to prevent the seat back from being rotated when the child seat is in a deployed position and also to prevent the child seat from being deployed when the seat back has been unlatched from its use position.

While the present invention has been disclosed and described in the context of a bench seat assembly for installation within a van-type vehicle, it is apparent that the invention can be employed in other seat assembly embodiments. Any seat assembly having a movable seat back and with a latch for holding the seat back in its use position can be equipped with an integral child seat and a interlock to prevent rotation of the seat back when the child seat is deployed.

While the above description constitutes the preferred embodiments of the present invention, it will be appreciated that the invention is susceptible of modification, variation and change without departing from the proper scope and fair meaning of the appended claims.

We claim:

1. A seat assembly for use in a motor vehicle comprising:

a generally horizontal adult seat cushion having front and rear ends;

an adult seat back including a back panel with upper and lower ends, said back panel being movable between a first use position in which said back panel extends generally upward from the rear end of said seat cushion and a first stowed position, said adult seat cushion and said adult seat back providing seating surfaces for an adult seat occupant at a seating position;

releasable latch means for retaining said back panel in said first use position, said releasable latch means being releasable for permitting movement of said back panel from said first use position;

a child seat providing seating surfaces for a child seat occupant at said seating position including a child seat member movable between a second stowed position and a second use position, said child seat member enabling use of said seat assembly at said seating position by a child when said child seat member is in said second use position and said child seat member enabling use of said seat assembly at said seating position by an adult when said child seat member is in said second stowed position; and interlock means between said releasable latch means and said child seat member for preventing release of said latch means when said child seat member has been moved from said second stowed position to said second use position whereby said back panel can not be moved from said first use position when said child seat member has been moved from said second stowed position, said interlock means including a lock member movable to a lock position in which said lock member is engagable with said latch means to prevent release of said latch means thereby preventing movement of said back panel from said first use position and cable means including a cable having a pair of ends with a first end being coupled to said child seat member and a second end being coupled to said lock member for moving said lock member to said lock position when said child seat member is moved from said second stowed position whereby said back panel is retained in said first use position.

2. The seat assembly of claim 1 wherein said child seat member has a lower end and is mounted to said seat back panel for rotation, about an axis extending laterally of said seat assembly at the lower end of said child seat member, between said second stowed position and said second use position.

3. The seat assembly of claim 1 wherein said latch means includes a latch release lever movable along a predetermined path between a latch position in which said latch means retains said back panel in said first use position and a release position in which said latch means is released to enable movement of said back panel from said first use position, said interlock means being operable to prevent movement of said latch release lever from said latch position to prevent release of said latch means thereby preventing movement of said back panel from said first use position.

4. The seat assembly of claim 3 wherein said latch release lever includes a handle portion for manual movement of said latch release lever from said latch position.

5. The seat assembly of claim 3 wherein said latch release lever and said lock member are mounted to said back panel.

6. The seat assembly of claim 3 further comprising bias means for urging said latch release lever into said latch position.

7. The seat assembly of claim 3 wherein said lock member is movable into said path of said latch release lever for engagement with said latch release lever upon partial movement of said latch release lever from said latch position.

8. The seat assembly of claim 7 wherein said latch release lever, when in said release position, prevents movement of said lock member into said lock position whereby said child seat member is prevented from moving into said second use position.

9. The assembly of claim 1 wherein said seat back panel is mounted for rotation about a transverse axis at the lower end of said back panel for moving said seat back panel between said first use position and said first stowed position.

10. The seat assembly of claim 1 further comprising bias means acting on said lock member for urging said lock member away from said lock position and for applying a tensile force to said cable.

11. The seat assembly of claim 1 further comprising:
a pivot bracket having a radially extending clevis coupled to said cable first end; and
coupling means for coupling said child seat member to said pivot bracket for rotation of said pivot bracket in a direction to pull on said cable upon rotation of said child seat member from said second stowed position to said second use position.

12. The seat assembly of claim 11 wherein said coupling means includes a cam surface carried by said child seat member for rotation therewith and a first lever extending radially from said pivot bracket engaging said cam surface and following said cam surface as said first child seat member is rotated, said cam surface being shaped to cause rotation of said pivot bracket in said direction to pull on said cable when said child seat member is rotated from said second stowed position.

13. The seat assembly of claim 11 wherein said pivot bracket is pivotally mounted to said seat back.

14. A seat assembly for use in a motor vehicle comprising:
a generally horizontal adult seat cushion having front and rear ends;
an adult seat back including a back panel with upper and lower ends, said back panel being movable between a first use position in which said back panel extends generally upward from the rear end of said seat cushion and a first stowed position, said adult seat cushion and said adult seat back providing seating surfaces for two adult seat occupants at two seating positions;
releasable latch means for retaining said back panel in said first use position, said releasable latch means being releasable for permitting movement of said back panel from said first use position;
a pair of child seats providing a seating surface for a child seat occupant at each of said seating positions including a pair of child seat members movable between second stowed positions and second use positions, said child seat members enabling use of said seat assembly at said seating positions by two children when said child seat members are in said second use positions and said child seat members enabling use of said seat assembly at said seating positions by two adults when said child seat members are in said second stowed positions; and
interlock means between said releasable latch means and said child seat members for preventing release of said latch means when one of said child seat members has been moved from said second stowed positions to said second use positions whereby said back panel can not be moved from said first use position when said child seat members have been moved from said second stowed positions, said interlock means including a lock member movable to a lock position in which said lock member is engagable with said latch means to prevent release of said latch means thereby preventing movement of said back panel from said first use position and cable means including a single cable having a pair of ends with a first end being coupled to said child seat members and a second end being coupled to said lock member for moving said lock member to said lock position when one of said child seat members is moved from said second stowed positions whereby said back panel is retained in said first use position.

15. The seat assembly of claim 14 further comprising:
a pivot bracket rotatably mounted to said seat back and having a radially extending clevis coupled to said cable first end; and
coupling means for coupling said child seat members to said pivot bracket for rotation of said pivot bracket in a direction to pull on said cable upon rotation of either of said child seat members from said second stowed positions to said second use positions.

16. The seat assembly of claim 15 wherein said coupling means includes a pair of cam surfaces, one carried by each of said first child seat members for rotation therewith, and a pair of levers extending radially from said pivot bracket each engaging one of said cam surfaces and following said cam surfaces as said child seat members are rotated, said cam surfaces being shaped to cause rotation of said pivot bracket in said direction to pull on said cable when one of said child seat members is rotated from said second stowed positions.

* * * * *